(12) United States Patent
Cronley

(10) Patent No.: US 6,786,516 B2
(45) Date of Patent: Sep. 7, 2004

(54) QUICK-CONNECTING COUPLER FOR HOSES, PIPES AND FAUCETS

(76) Inventor: Gerald Cronley, 3636 Lake Lynn Dr., Gretna, LA (US) 70056

( * ) Notice: Subject to any disclaimer, the term of this patent is extended or adjusted under 35 U.S.C. 154(b) by 0 days.

(21) Appl. No.: 10/180,561

(22) Filed: Jun. 27, 2002

(65) Prior Publication Data

US 2004/0000788 A1 Jan. 1, 2004

(51) Int. Cl.⁷ ............................................... F16L 21/06
(52) U.S. Cl. ......................... 285/322; 285/323; 285/34; 285/314
(58) Field of Search ........................... 285/34, 32, 322, 285/323, 35, 314

(56) References Cited

U.S. PATENT DOCUMENTS

| | | | |
|---|---|---|---|
| 1,297,719 A | | 3/1919 | Myers |
| 1,315,784 A | | 9/1919 | Levitt |
| 1,927,582 A | | 9/1933 | Denk |
| 1,966,278 A | | 7/1934 | Barks et al. |
| 2,098,514 A | | 11/1937 | Nord |
| 2,259,137 A | * | 10/1941 | Iftiger, Sr. ................... 285/35 |
| 2,327,714 A | | 8/1943 | Iftiger, Sr. |
| 2,383,692 A | | 8/1945 | Smith |
| 2,388,179 A | | 10/1945 | Prowd |
| 2,705,652 A | * | 4/1955 | Kaiser .......................... 285/35 |
| 3,168,333 A | * | 2/1965 | Dziura ......................... 285/35 |
| 3,394,950 A | | 7/1968 | Jensen |
| 4,433,859 A | * | 2/1984 | Driver et al. .................. 285/34 |
| 4,660,803 A | | 4/1987 | Johnston et al. |
| 4,856,823 A | | 8/1989 | Heren ........................... 285/81 |
| 5,112,087 A | | 5/1992 | Haruki ........................ 285/101 |
| 5,118,140 A | | 6/1992 | Racine et al. ................ 285/102 |
| 5,150,924 A | | 9/1992 | Yokomatsu et al. ......... 285/101 |
| 5,209,528 A | | 5/1993 | Weh et al. .................... 285/315 |
| 5,217,039 A | | 6/1993 | Hoeptner, III .............. 137/218 |
| 5,503,437 A | | 4/1996 | Cronley ........................ 285/34 |
| 5,649,723 A | * | 7/1997 | Larsson ........................ 285/34 |
| 5,788,289 A | | 8/1998 | Cronley ...................... 285/102 |

FOREIGN PATENT DOCUMENTS

| | | |
|---|---|---|
| CA | 968388 | 5/1975 |
| DE | 1210637 | 2/1966 |
| FR | 527729 | 6/1924 |
| GB | 789 | 1/1906 |
| GB | 180804 | 6/1922 |
| GB | 1241167 | 7/1971 |

OTHER PUBLICATIONS

Victaulic Couplings Product Literature.

* cited by examiner

Primary Examiner—David E. Bochna
(74) Attorney, Agent, or Firm—Milton S. Gerstein

(57) ABSTRACT

A coupler for coupling a male end of a hose to a female end of a faucet or another hose. In the first embodiment, the female end of the coupler is mechanically locked in sealing engagement with a male end by simply translation thereof by means of wedges and an outer retaining sleeve. In a second embodiment, hydraulic pressure provides the final seal, with the female end being a spring split-ring locked and compressed by means of an outer locking sleeve, which outer locking sleeve is released by squeezing it in order to deform it. A third embodiment combines the first and second embodiments.

16 Claims, 16 Drawing Sheets

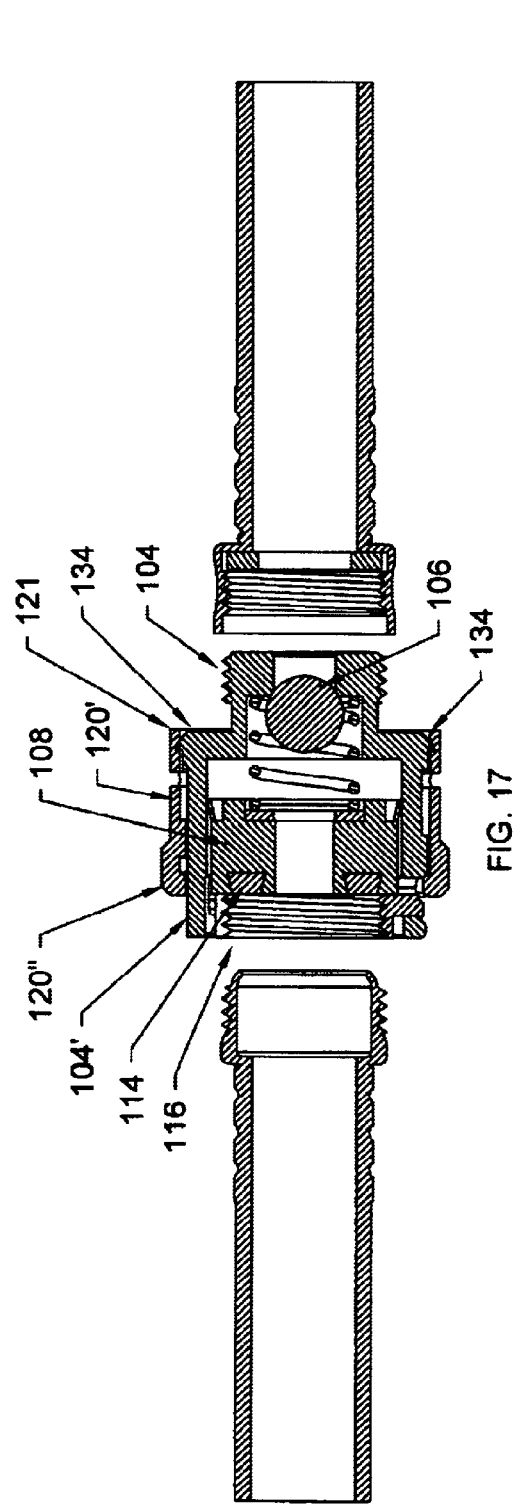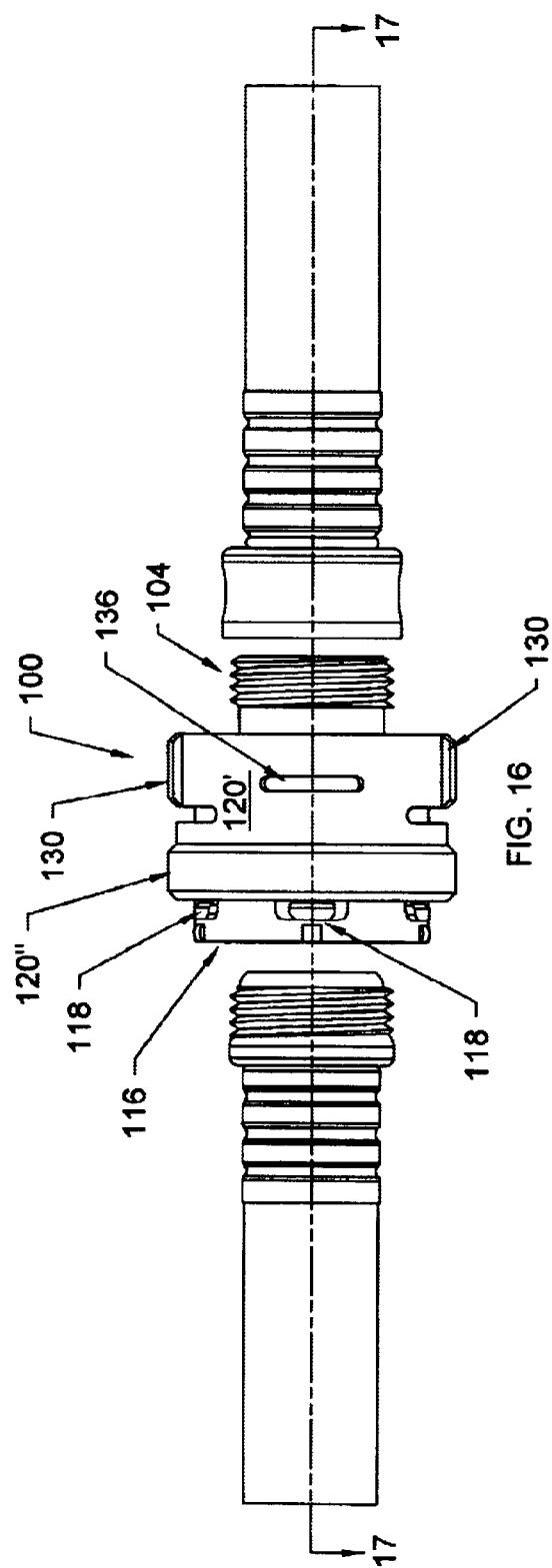

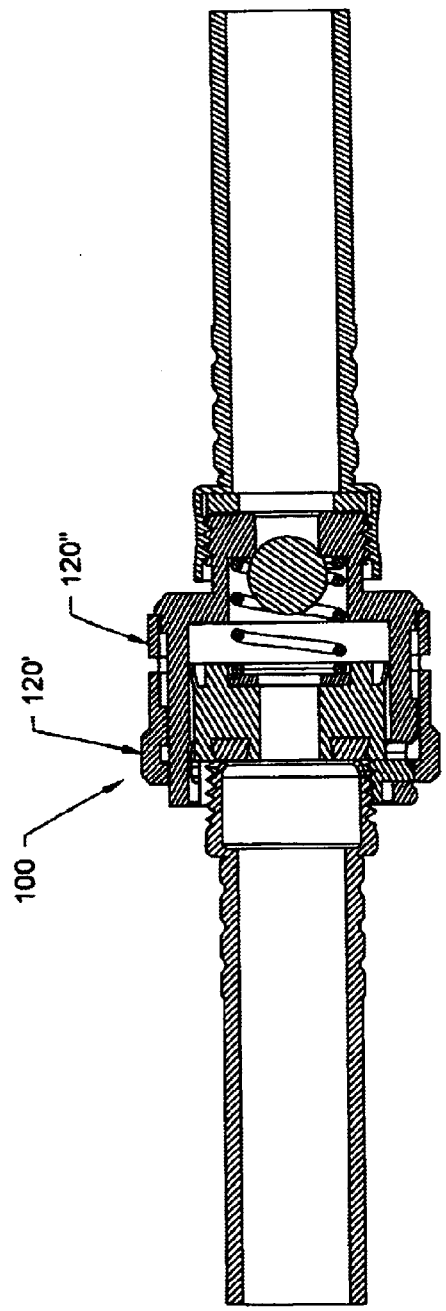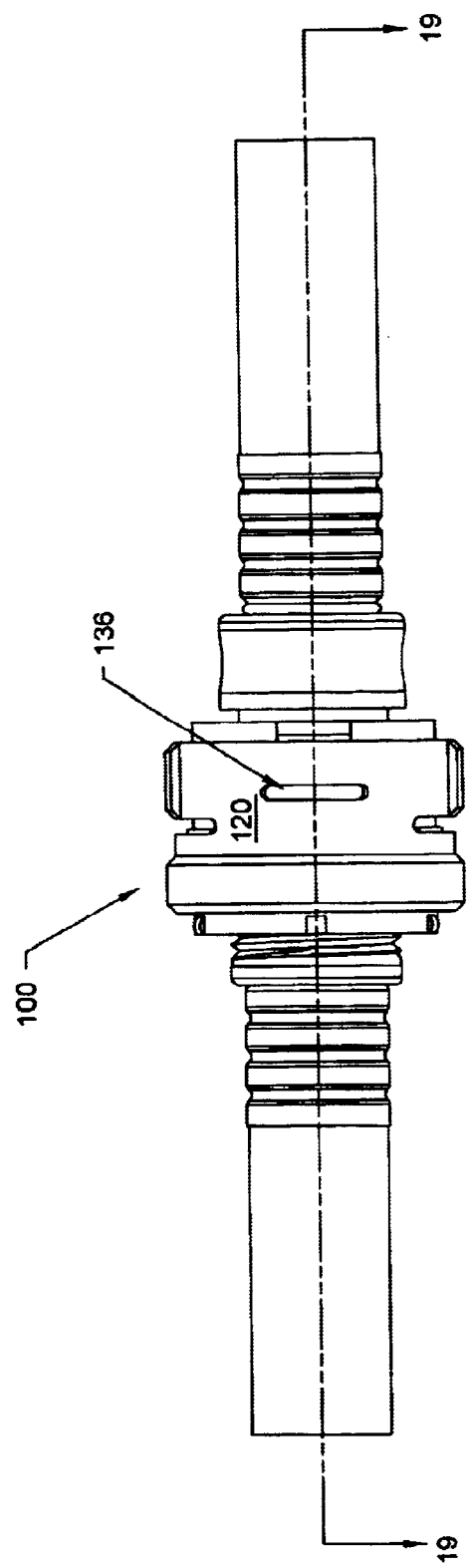

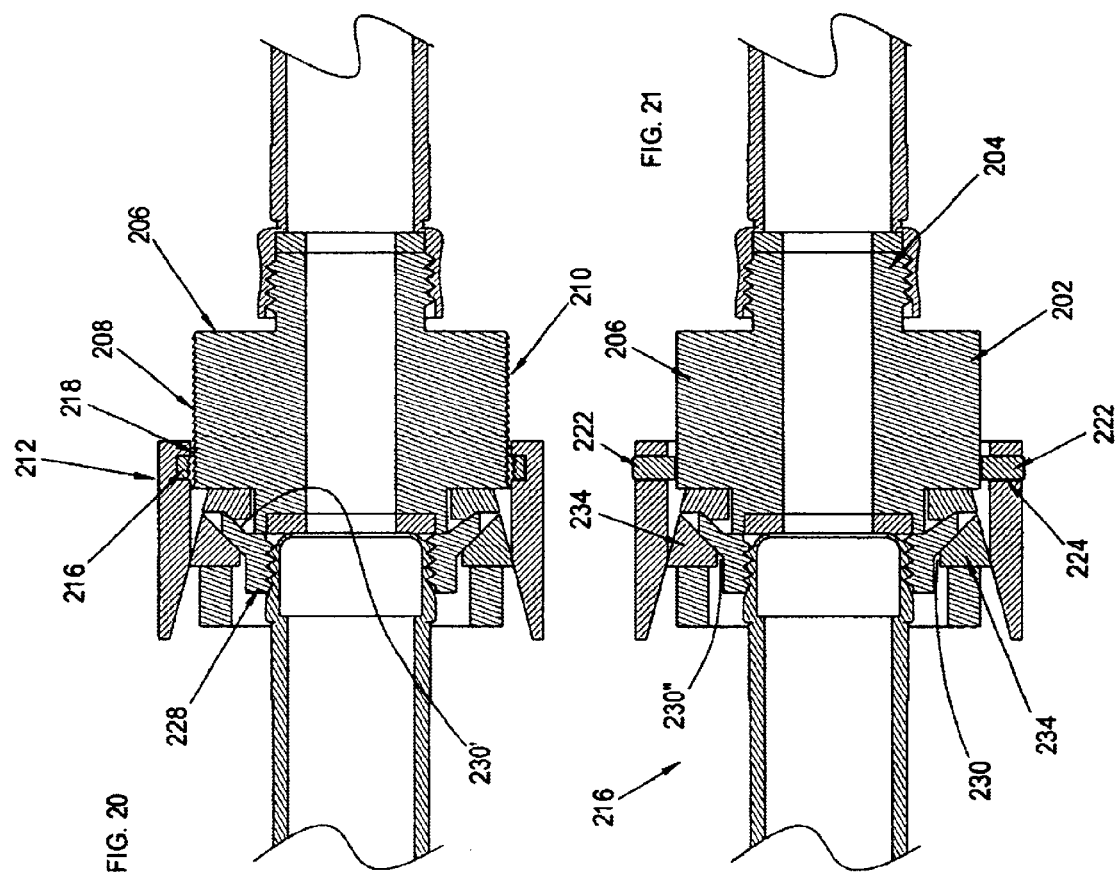

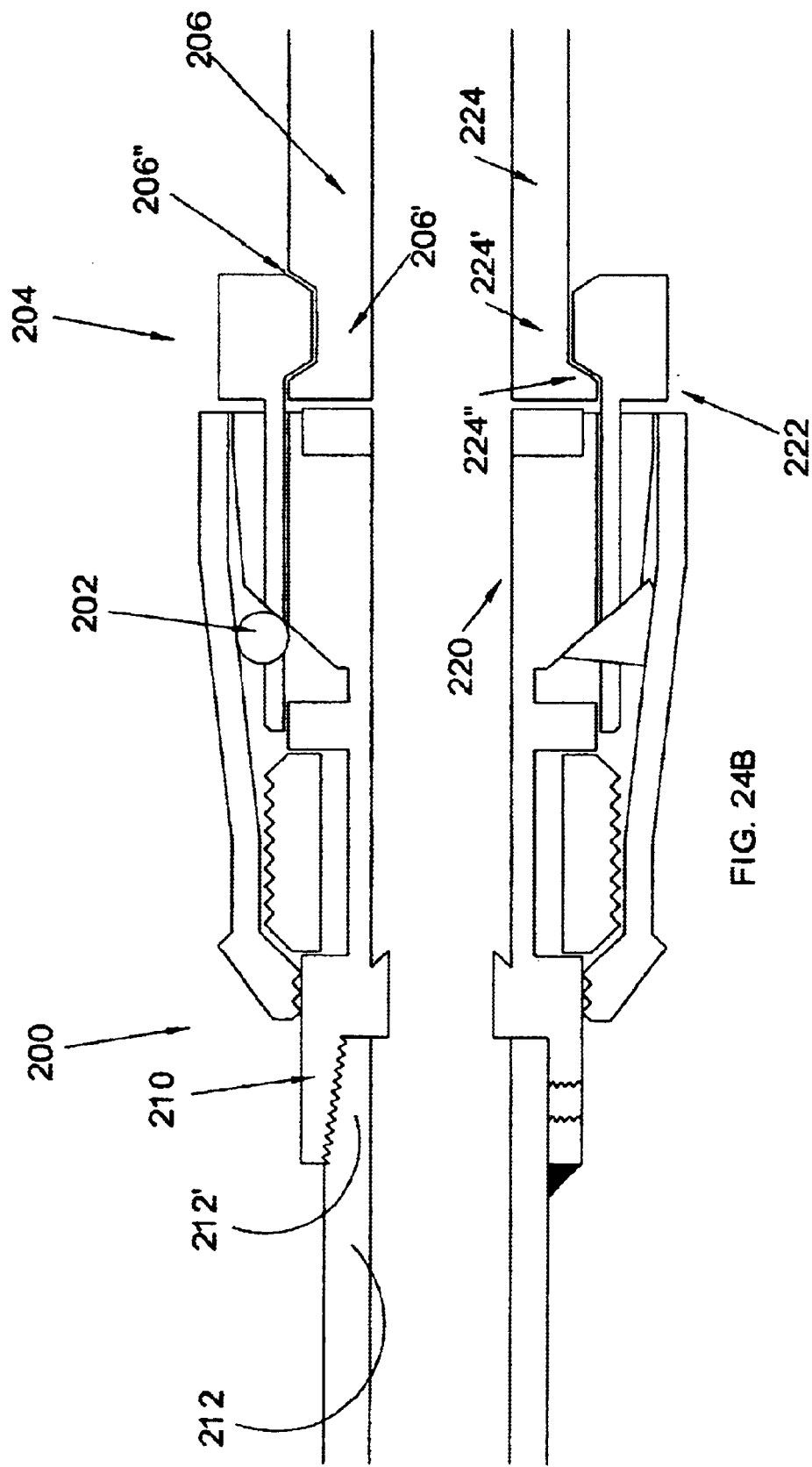

QUICK-CONNECTING COUPLER FOR HOSES, PIPES AND FAUCETS

BACKGROUND OF THE INVENTION

The present invention is directed to a coupler for connecting a male-end of one hose or tube to a female end of another hose or tube. Examples of prior-arts quick-connecting hose couplers are disclosed in Applicant's previous U.S. Pat. Nos. 5,503,437 and 5,788,289.

SUMMARY OF THE INVENTION

It is the primary objective of the present invention to provide a quick-connecting hose coupler which is more facilely connected and disconnected.

It is also the primary objective of the present invention to provide a first embodiment where the hose coupler is-locked in place by mechanical action.

It is also the primary objective of the present invention to provide a second embodiment where the hose coupler is locked in place by water pressure.

It is also the primary objective of the present invention to provide a coupler that has a female-end that provides a facile and secure reception of a threaded male-end of a hose, faucet, and the like.

In a first mechanical-locking embodiment, the coupler has a main frame, a collet mounted for slidable movement in the main frame, which collet comprises flexible thread-engaging means for engaging the threads of a male-portion of an element. An outer retaining member slides about the main frame, and telescopingly movable about the collet for preventing the flexible thread-engaging means from disengaging with the male-portion of an element. Inner retaining means are mounted by the main frame for relative sliding motion in the outer retaining member for holding the outer retaining member in a locking position. Scaling means are operatively associated with the main frame for providing a seat for threads of a male-end of an element. Means are provided for moving the collet and its flexible thread-engaging means toward and away from the sealing means.

In a second, hydraulically-locking embodiment, the female end is a spring split-ring locked and compressed by means of an outer locking sleeve, which outer locking sleeve is released by squeezing it in order to deform it. A third embodiment combines the first and second embodiments.

BRIEF DESCRIPTION OF THE DRAWING

The invention will be more readily understood with reference to the accompanying drawings, wherein:

FIG. 16 is a side view thereof before engagement with hoses;

FIG. 17 is a cross-sectional view taken along line 17—17 of FIG. 16;

FIG. 18 is a side view thereof after engagement with hoses;

FIG. 19 is a cross-sectional view taken along line 19—19 of FIG. 18;

FIG. 20 is a longitudinal cross-sectional view of a third embodiment of the invention shown connected between male and female ends;

FIG. 21 is a view similar to FIG. 20 but 90 degrees therefrom;

FIG. 24A is a partial longitudinal cross-section view showing a modification of the mechanical quick-coupler of FIG. 1; and FIG. 24B is a partial longitudinal cross-section view showing another modification of the mechanical quick-coupler of FIG. 1.

DETAILED DESCRIPTION OF THE INVENTION

Figure 3:
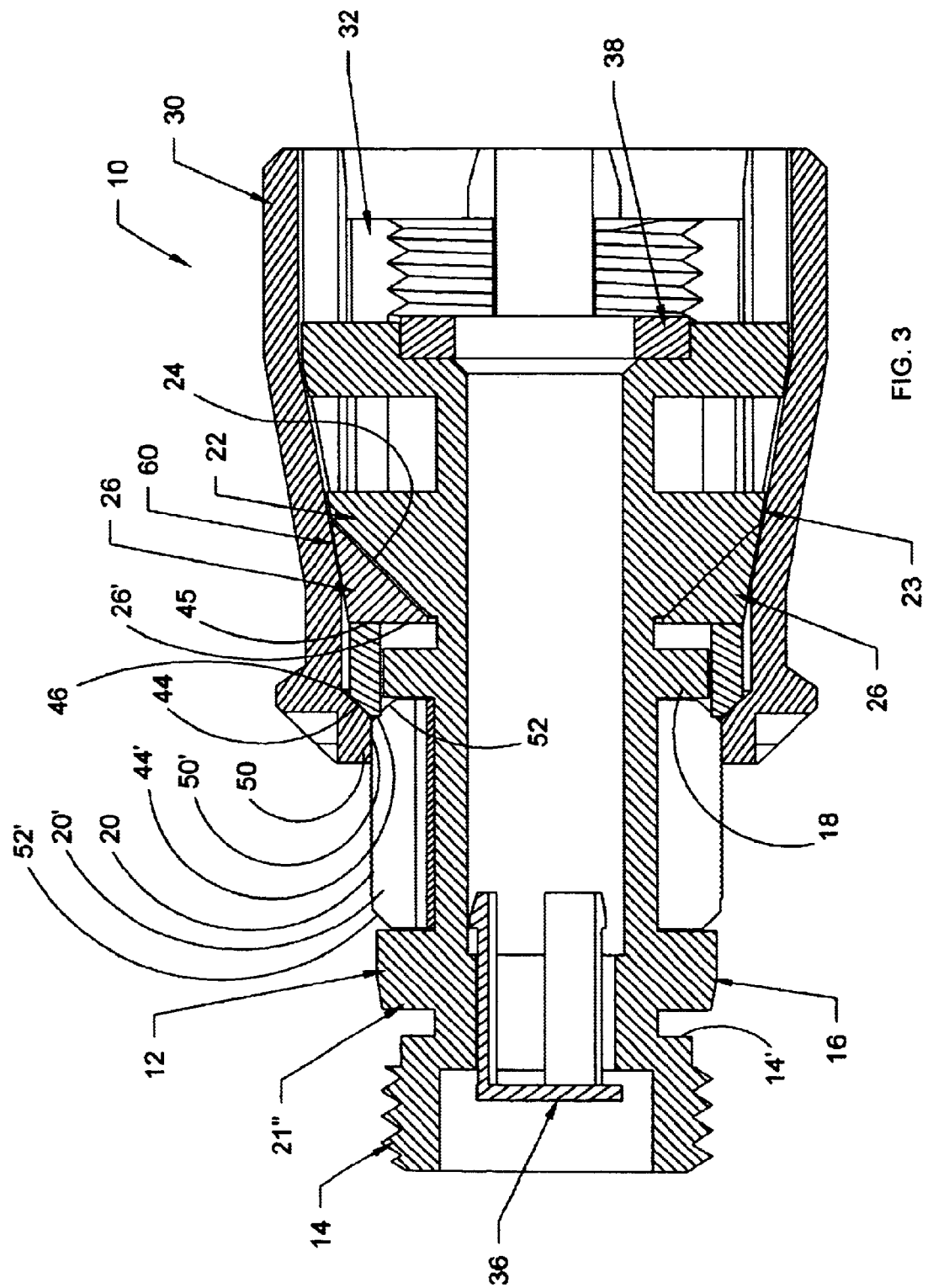
FIG. 3 is a longitudinal cross-sectional view thereof showing the hose coupler in its engaged state gripping a male end of a hose or faucet.
Figure 4:
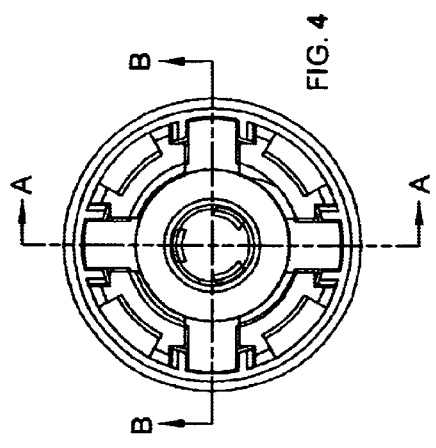
FIG. 4 is an end view thereof.
Figure 5:
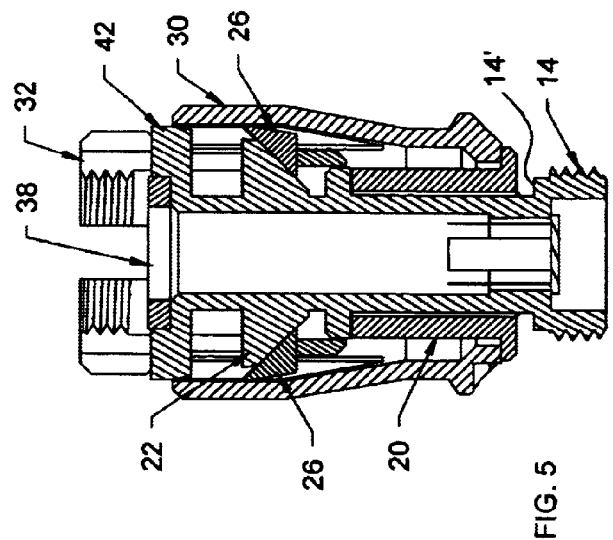
FIG. 5 is a cross-sectional view taken along line 5—5 of FIG. 4.
Figure 6:
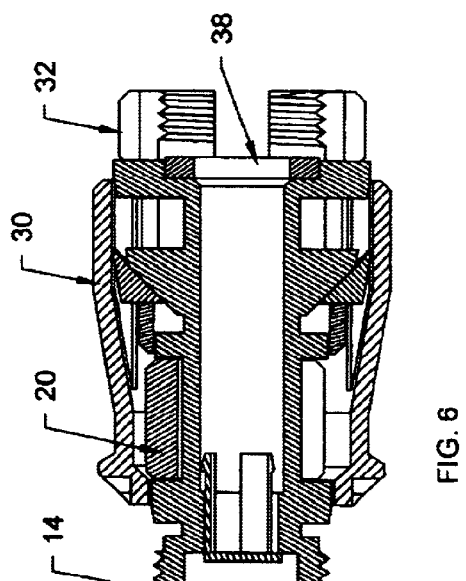
FIG. 6 is a cross-sectional view taken along line 6—6 of FIG. 4 showing the hose coupler in its disengaged state.
Figure 7:
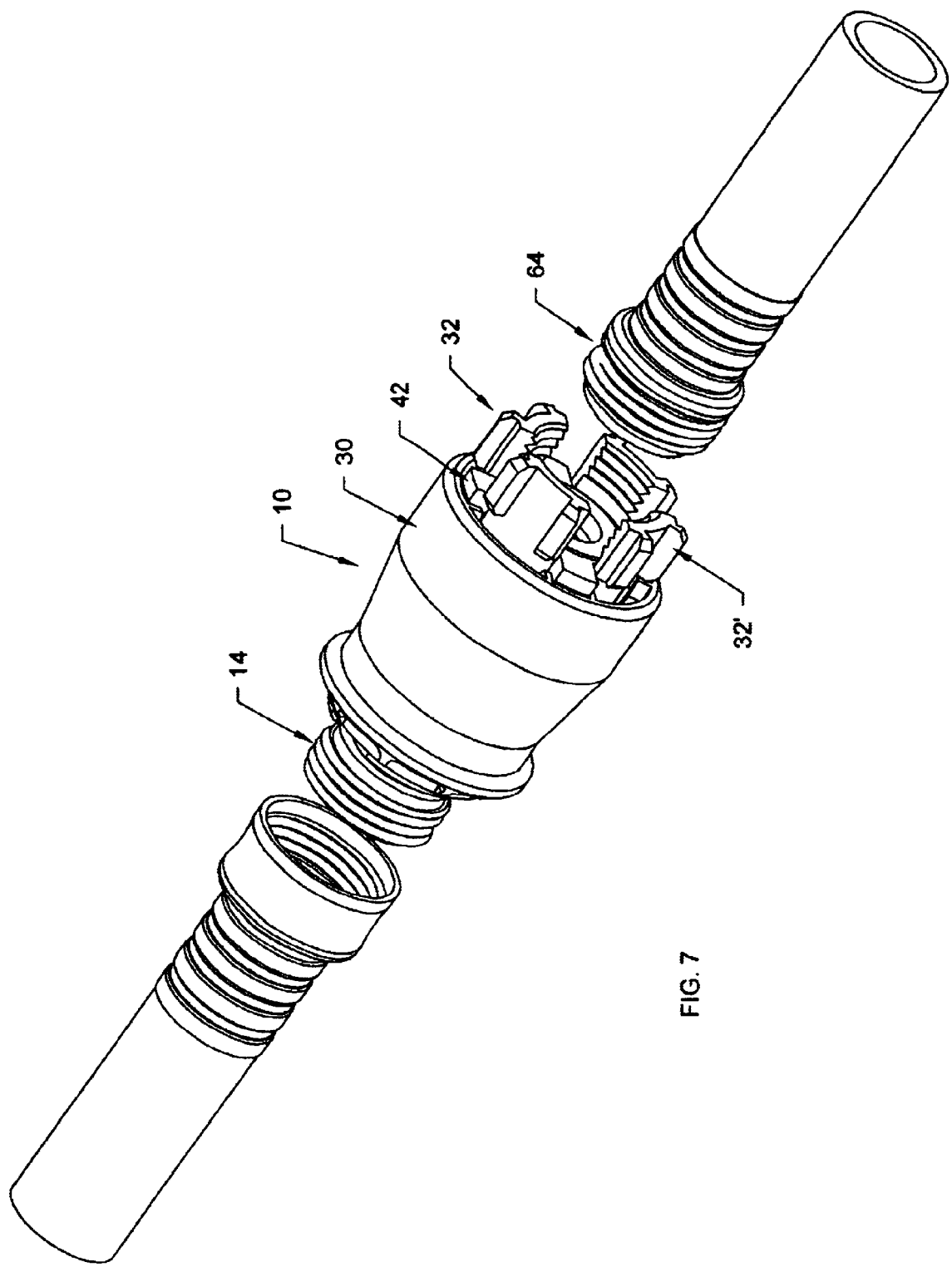
FIG. 7 is an isometric assembly view showing the connection of the hose coupler to the male end and female end of two hoses or tubes, or between the female end of a hose or tube and the male threads of a faucet.
Figure 11:
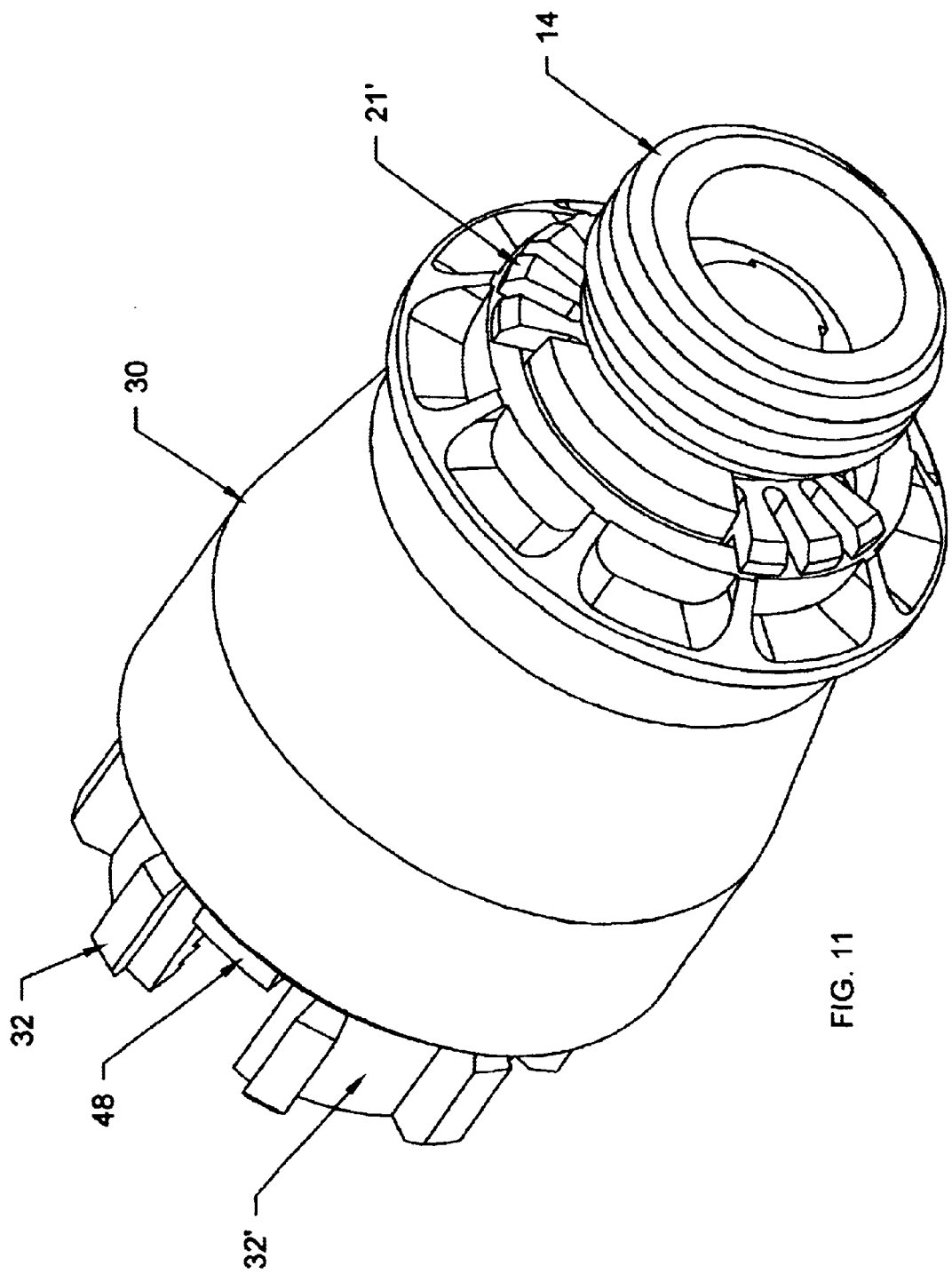
FIG. 11 is a rear isometric view thereof showing the coupler in its engaged state.

Referring now to the drawings in greater detail, there is shown in FIGS. 1–11, a first embodiment 10 of the quick-connecting coupler of the invention for quick-connecting hoses, faucets, tubes, pipes, and other devices. The coupler 10 has a one-piece, rim body portion or frame 12 defining, at one end, a male-threaded end-portion 14 for receiving a female end of a hose, when the coupler 10 is to be used for coupling a hose to another hose or faucet, or the like. The main frame is provided with a first annular rim or member 16 and a second annular member or ring 18 for mounting therebetween a compressible sleeve-member 20, the purpose of which is described hereinbelow in greater detail. The compressible member 20 is compressible radially inwardly, and is formed with a plurality of recesses or grooves 21 in order to aid in its resiliency and compressibility. Upstanding end-stops or detents 21' abut against the outer edge-surface 21" of the first annular member 12, there being a gap between the inner surface 14' of the threaded male-end 14 and the outer edge-surface 21", which abutment occurs when the coupler 10 is fully engaged, as can be seen in FIG. 11. The annular member or ring 18 is provided with a plurality of cutouts or spaces 18' for purposes to be described hereinbelow. The main frame also has preferably four annular, distinct, wedge-shaped sections 22' defining spaces or cutouts 22" therebetween for exposing the outer surface of the main frame 12 thereat. Each section 22' defines a sloping or canted engaging surface 24 facing in a direction toward the first male-threaded end-portion 14. The canted surface 24 slopes toward the first male-threaded end-portion 14 when viewed from the exterior or outer surface of the respective third annular section 22' interiorly therefrom, such that each annular member section 22' tapers to a narrower annular outer surface 23. The canted surface 24 is a camming guide-surface for cooperating with movable wedge-members 26, the purpose of which is described hereinbelow in greater detail. Telescopingly mounted about the main frame is a slidable retaining or locking sleeve 30. Slidably mounted in the main frame is a slidable, multi-furcated or split, annular female end-member or collet 32 defining four resilient, threaded or grooved claw-elements 32' (see FIG. 8) having interiorly-facing threads or grooves 32" for engaging the male threads of a male-end of a hose or faucet, or the like. Each claw-element 32' has two outer cam-elements 34 by which the claw-elements 32' are held or retained in locking engagement with the male threads of the hose or faucet by the interior surface of the slidable locking sleeve 30. It is noted, unlike prior-art couplers, the slidable locking sleeve 30 does not force or cam the claw-elements into engagement with the threads of the male-end, but merely maintains or holds them in engagement therewith after they have already become engaged in the manner described hereinbelow. The claw-elements 32' extend through the cavities or spaces 22" of the four distinct sections 22' for relative sliding movement therein, and therebetween. It is noted that the inner diameter of the claw-elements 32' is greater than the outer diameter of the annular member 18, so that claw-elements clear the annular member 18, as seen in FIG. 3.

The main frame 12 also has a female-end, annular collar 40 with four radially-extending protrusions 42 axially aligned with the four distinct sections 22', so that the spaces or gaps between the four perpendicularly-extending protrusions 42 are also aligned with the cavities or spaces 22" between the wedge-shaped sections 22, whereby the end-portions of the claw-elements 32' extend for sliding movement The slidable, split, annular female end-member, or split collet, 32 has an interior annular surface edge-face consisting of sloping or canted surface face 44 and a second vertical or straight edge-face 44'. The compressible annular member or sleeve-member 20 has canted or sloped end edge-faces 52, 52'. The edge-face 52 cooperates with the vertical or straight edge-face 44', while the end end-face 52' cooperates with the sloping or canted surface face 44 of the retaining sleeve. The compressible annular member 20 has an outer surface that is at least partially grooved or threaded for cooperation with straight, or horizontal, perpendicular surface 50 that is also grooved or threaded for mating contact therewith for locking the outer retaining sleeve 30 in its extended state for keeping or holding the claw-elements in their engagement with the threads of a male-end or faucet, or the like.

Each wedge-member 26 defines an upper wedge-surface 60 that is engageable with the interior surface of the retaining sleeve 30, as best seen in FIG. 3, whereby the retaining ring 30 forces the wedge-members 26 downwardly against respective sloping or canted engaging surfaces 24 of the four annular, distinct, wedge-shaped, sections 22' when the retaining sleeve is slid into its locking state, which is to the right when viewing FIG. 3.

The hose-coupler 10 also has a conventional check valve 36 at the male-end portion 14, and a washer element 38 at the female end of the hose coupled, in the conventional manner for sealing engagement with the male-end of the hose or faucet received in the female-end of the hose-coupler 10, when there is a need for hydraulic sealing, it being understood that in those uses of the present invention where sealing is not required, the washer element 38 need not be provided.

Figure 8:
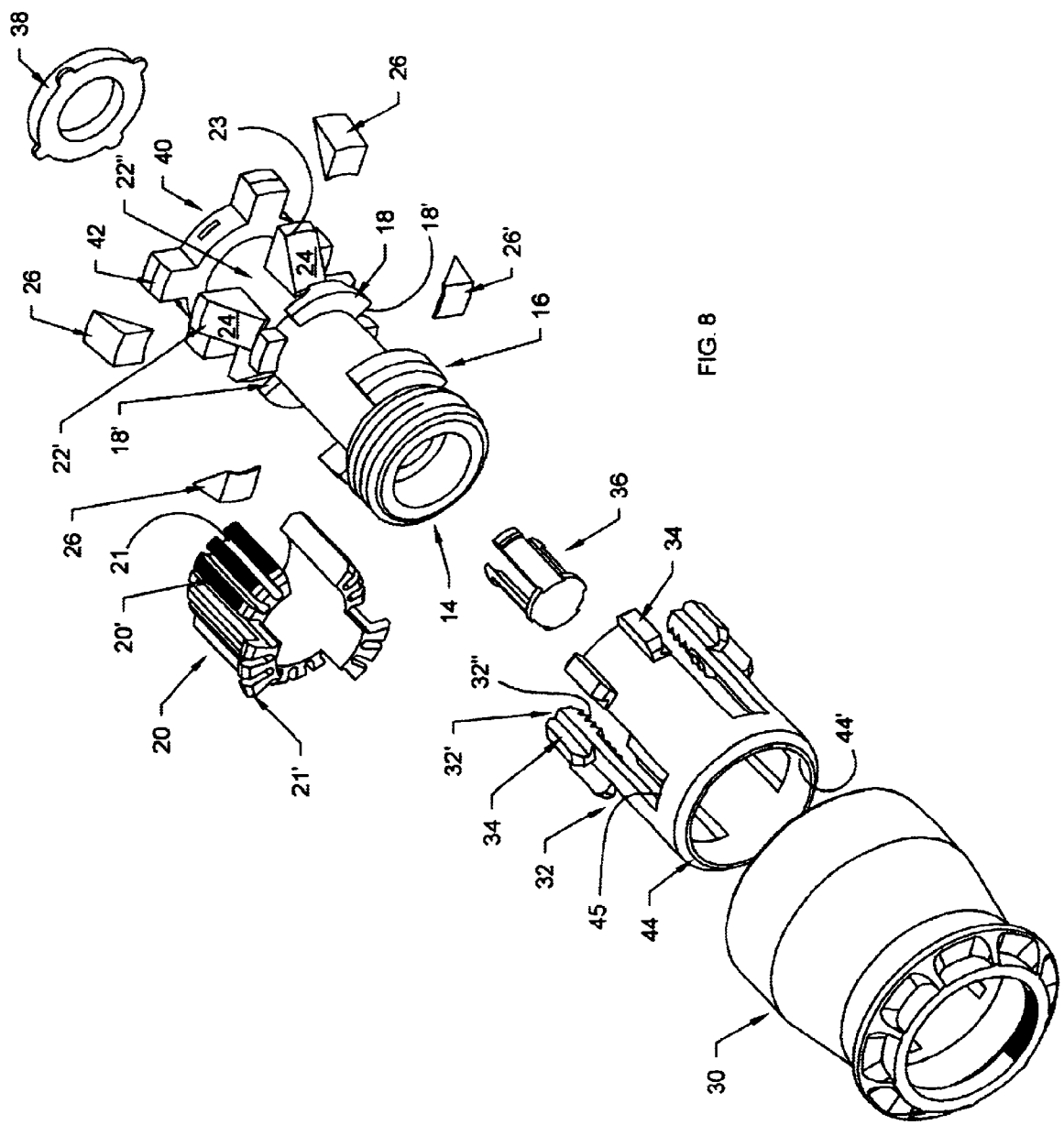
FIG. 8 is an isometric assembly view thereof.
Figure 9:
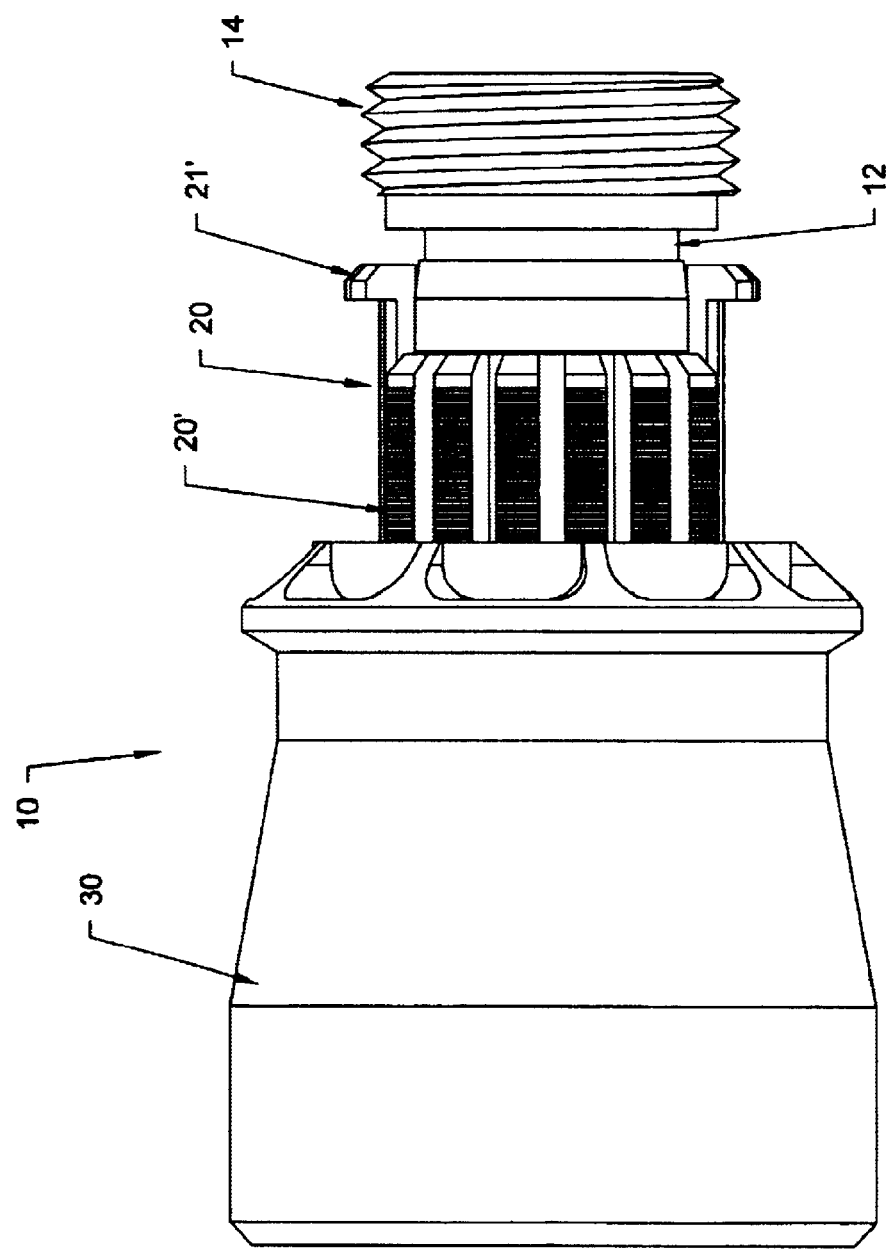
FIG. 9 is a top view thereof in its engaged state.
Figure 10:
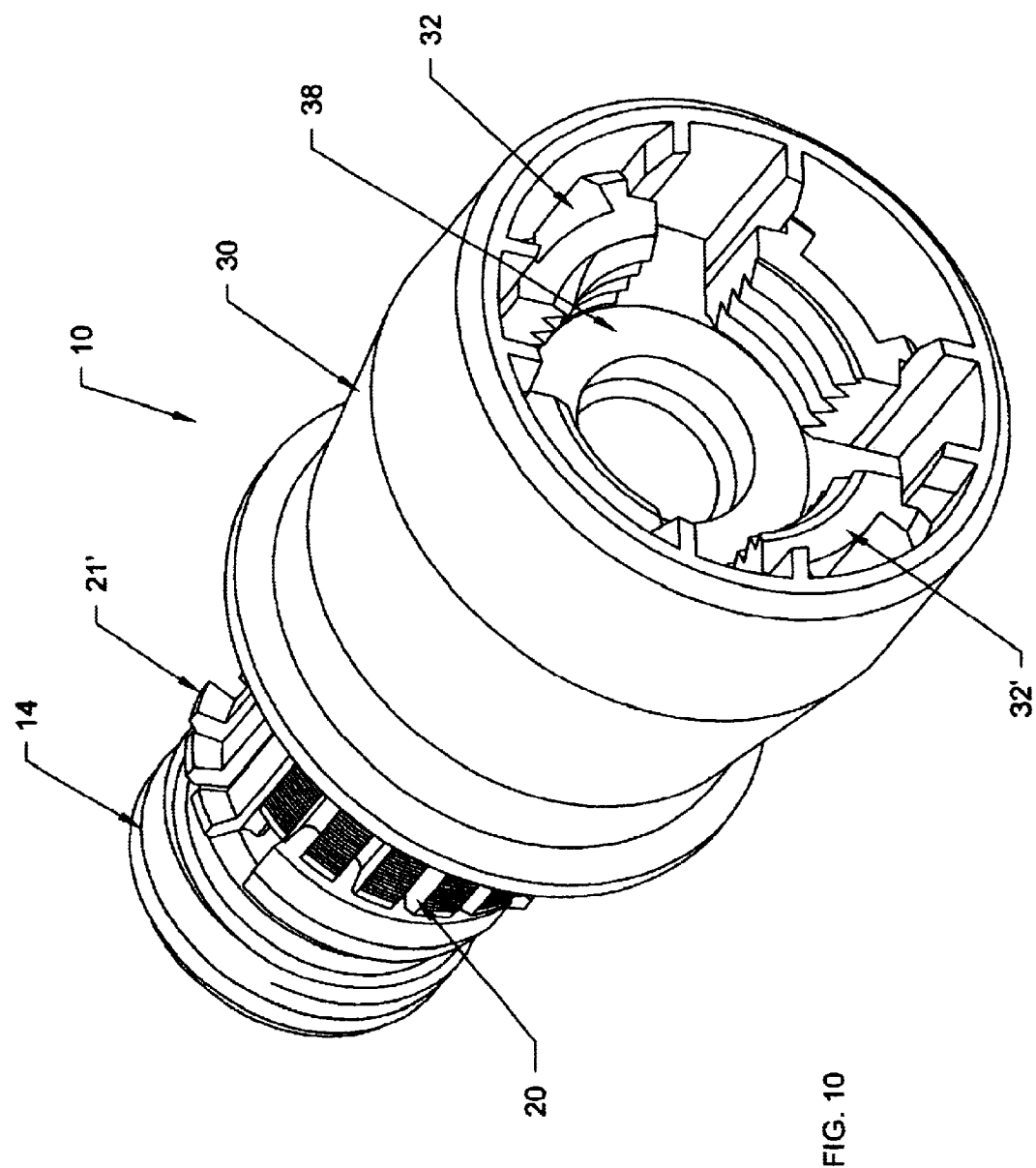
FIG. 10 is a front isometric view thereof showing the coupler in its released state.

The hose-coupler 10 operates as follows. A female-end of a first end of a hose, tube, or other device, is screwed onto the male-end of the coupler 10, when the coupler 10 is to be used to couple threaded ends together, it being understood that the coupler of the invention may be provided only with a female end, with the other end of the coupler being affixed to, or part of, another device to be attached to a threaded male-end of a hose, faucet, or the like. A male-end of another hose or of a faucet is then attached to the female-end of the hose-coupler 10 as follows A male-end 62 (FIG. 7) is pushed interiorly into the collet 32, whereby initial engagement between the exterior male-threads of the male-end 62 engage with the interior threads 32" of the claw-elements 32' takes place, where the collet 32 and its claw-elements assume the initial, unsealed state shown in FIG. 6. The initial engagement is allowed via the floating cantilevered nature of the claw-elements 32'. As the male-end 62 is pushed into the collet 32, the collet with its the claw-elements 32' are pushed backwardly, or rearwardly, into the interior of the main frame 12, until the interior annular surfaces 44' thereof abut against forwardly-facing sloped surface 52 of the compressible annular member 20, which provides an initial limit to the rearward movement of the collet 32 and its claw-elements 32'. The retaining or setting sleeve 30 is then moved forwardly, or to the right when viewing FIG. 6, which initially compresses or squeezes the compressible sleeve-member 20 inwardly via cooperating canted surfaces 46 and 52', and then, after further sliding movement, maintains this compressed state of the compressible annular member 20 via cooperating threads or grooves 20' formed on the outer surface of the annular member 20 and threads or grooves 50' formed on the interior, annular end-surface 50 of the setting ring 30 after the claw-elements 32' are sealingly locked in place with the male-threads of the male-end inserted therein. This initial compression or squeezing of the compressible sleeve-member 20 allows for additional, rearward or interior movement of the claw-elements 32', since the interior annular surfaces 44 of the collet 32 may then ride rearwardly along sloped surfaces 52 of the compressible sleeve-member 20, which further additional movement is caused by the wedge 26 as described herein. As the retaining ring 30 is moved further toward the female-end of the hose-coupler, wedges 26 are forced downwardly and rearwardly to thus also force the claw-elements 32' rearwardly toward the male-end 14, which rearward movement is allowed owing to the fact that the compressible annular member 20 had been compressed, or squeezed, by the initial movement of the outer retaining ring 30. The wedges 26 force the collet 32 with its claw-elements 32' rearwardly by the contact of the rear, vertical surfaces 26' of the wedges 26 against the annular surfaces 45 of the collet member 32 formed in the spaces between the claw-elements 32', as best seen in FIG. 8. Rearward movement of the claw-elements 32' via the wedges 26 causes the male-end 64 of a hose or faucet to be drawn and forced tightly in sealing engagement with the washer-element 38. With the final outward sliding movement of the retaining sleeve, the retaining sleeve will cover or surround the claw-elements to thus prevent the disengagement of the threads thereof with the threads of the male-end 64 of the hose or faucet. Engagement of the cooperating threads or grooves 20' formed on the outer surface of the compressible sleeve-member 20 with the threads or grooves 50' formed on the interior, annular end-surface 50 of the setting sleeve 30, prevents disengagement of the claw-elements 32' of the collet 32 with the threads of the male-end therein unless manual counterforce is applied when one wants to disengage and remove the male-end 634 from connection to the hose-coupler 10. The retaining or setting sleeve 30 does not cam or force the claw-elements into engagement with the male-end located with the collet 32, but merely prevents disengagement therebetween by preventing the claw-elements from flexing outwardly, which outward flexing, as described hereinabove, allows the male-end to be pushed into the interior of the collet 32 for engagement between the threads of the inserted male-end and the threads or grooves 32" of the claw-elements 32'.

In a preferred version, the wedge-surface 24 preferably is approximately 45 degrees, while the upper wedge-surface 60 preferably has an-angle of approximately 10 degrees. The retaining sleeve has a total movement of 0.596 inches, while the total longitudinal movement of the collet is approximately 0.105 inches. The mechanical advantage is 6:1. The compression of the compressible member allows the additional approximate 0.065 in. which is included in the total movement of 0.105 in.

In order to disengage and remove the male-end 64, the retaining sleeve 30 is moved in the opposite, rearward direction, toward the male-end 14, thus releasing the claw-elements, and thus expanding the compressible annular member 20, forcing the claw-elements forwardly, to push the wedges 26 outwardly and upwardly, whereby the tight seal with the washer element 38 is broken. The male-end 64 may then be easily pulled off, since the outer retaining sleeve no longer prevents such disengagement.

The advantages to this mechanical-operation hose coupler is that no turning or rotation is required to make the seal, and no piston member relying on water pressure for the washer element is required, or spring therefor is required. Installation is achieved by lateral movement, or pushing, only in the direction of the male-end of the hose or faucet, which is the very same direction that the female-end of the hose-coupler is being urged during coupling. Additionally, the claw-elements of the collet float or flex, which allows the threads in the claw-elements of the collet and on the male-end of the hose or faucet to align at all times, ensuring not only ease of attachment, but also ensurance that engagement between the threads will occur at all times for all movement of the collet. In addition, the mechanical advantage is considerable; whereas conventional units require 23 lbs. of force to seal against a hose washer, the hose-coupler 10 of the invention requires only 4 lbs.

The coupler 10 of the invention may also be provided without a male-end, in which case, just the collet with its female end for receiving a threaded male-end is provided. Such an embodiment would have relevance to a quick-connector attached to an item or device that is to be attached to any type of faucet, pipe, etc., whether it be a water faucet or other type.

Referring now to FIGS. 12–19, there is shown a second embodiment of the hose-coupler of the invention which is clamped tightly about a male-end of a hose or faucet, or the like, by mainly hydraulic pressure. The coupler 100 consists of a main body portion or fame 102 defining a threaded male-end section 104, and a main tubular or cylindrical section 104'. Mounted within the main body portion is a male-end check ball 106 for closing of the opening 104' of the male-end section 104 when the hydraulic power has been turned off. This check ball allows water to leak out slightly in order to drain the hose. A sealing piston member 108 is also mounted for sliding movement in the main body portion, and is biased away from the male-end section 104 via a compression spring 110. Washers 112, 114 are located in either end surface of the piston member. A flexible, compressible, split spring sleeve or ring 116 is also provided which serves as a female end-section of the coupler 100 for receiving and holding therein a threaded male-end of a hose or faucet, or the like. The split sleeve 116 is provided with a plurality of radially-protruding ears or tabs 118 which project outwardly through and beyond suitably located and aligned openings or cutouts 120 formed in the main tubular or cylindrical section 104'. The cutouts 120 are of ample width to accommodate the sliding movement of the split sleeve 118. The tabs 118 allow for the expansion and compression of the split sleeve as described hereinbelow.

Figure 15:
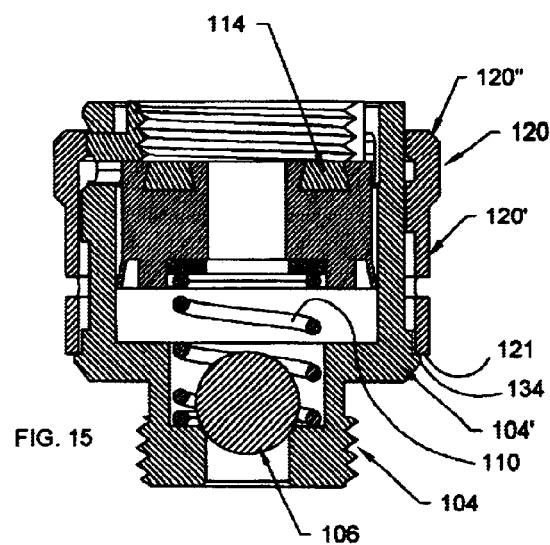
FIG. 15 is a cross-sectional view taken along line 15—15 of FIG. 13.

Slidably mounted about the main tubular or cylindrical section 104' is an outer releasing or unlocking sleeve or collet 120. The releasing sleeve 120 is slid backwardly, or rearwardly, or toward the male-end section 104 to expose the tabs 118 in order to allow them to expand fully when a male-end of a hose, faucet, pipe, or the like, is first inserted thereagainst, as best seen in FIGS. 15 and 17. This initial pushing on of the male-end causes it to move interiorly against the biased piston member 108 for an initial seal. This expansion allows the split ring to encompass or receive the male-end of a hose or faucet therein, and for the interior threads or grooves 122' to engage with the exterior male threads of the male-end inserted therein. After initial sealing, the outer collet 120 is then slid in the opposite direction, to thereby close off the cutouts or openings 120 and force the split ring to compress radially inwardly by camming the ears or tabs 118 radially inwardly, to force the split ring into its engaging state, as seen in FIGS. 18 and 19. In this engaged or locked state, the final seal is provided hydraulically by means of the fact that surface area of the piston member 108 is greater than sealing surface area of the washer 114 against which the piston abuts. Alternatively, the inner annular surface of the collet 120 may be provided with an annular groove having a camming surface that compresses the split ring radially inwardly into locking engagement via the tabs 118.

The releasing collet 120 is provided with a pair of exterior, radially-extending push-members 130 spaced 180 degrees apart. The collet 120 is formed with in an end-section 120" that is relatively thicker than the thinner section 120' of rest of the collet 120. Grooves or slits 136 are also provided in the thinner section to ensure that when the push-members 130 are squeezed, the thinner section 120' flexes and becomes distorted into an approximately elliptical or oval shape. Formed on the outer surface of the main tubular or cylindrical section 104' of main body portion 102, as can be seen in FIGS. 17 and 18, are a pair of outwardly projecting stops or stepped detents 140, spaced 180 degrees apart. These stepped detents engage with the annular end-surface of the collet 120 to hold it in place during engagement of the split ring with the male-end of a hose or faucet. The push-members 130 are 90 degrees out of phase with the stepped detents 140. When the push-members are squeezed to deform the thinner section 120', the portion of the annular end-surface 120' is bowed out enough of an amount so as to clear the stepped detents 134. This clearance allows the outer collet 120 to be moved or slid away from female-end section of the coupler 100, to thereby again allow the split ring 116 to expand, to thereby release the threaded engagement between the split ring and the male-end of a hose, faucet, pipe, or the like. This sliding release-movement again exposes the tabs 116 of the split ring 116 to allow their expansion to release the male-end of a hose or faucet.

Figure 1:
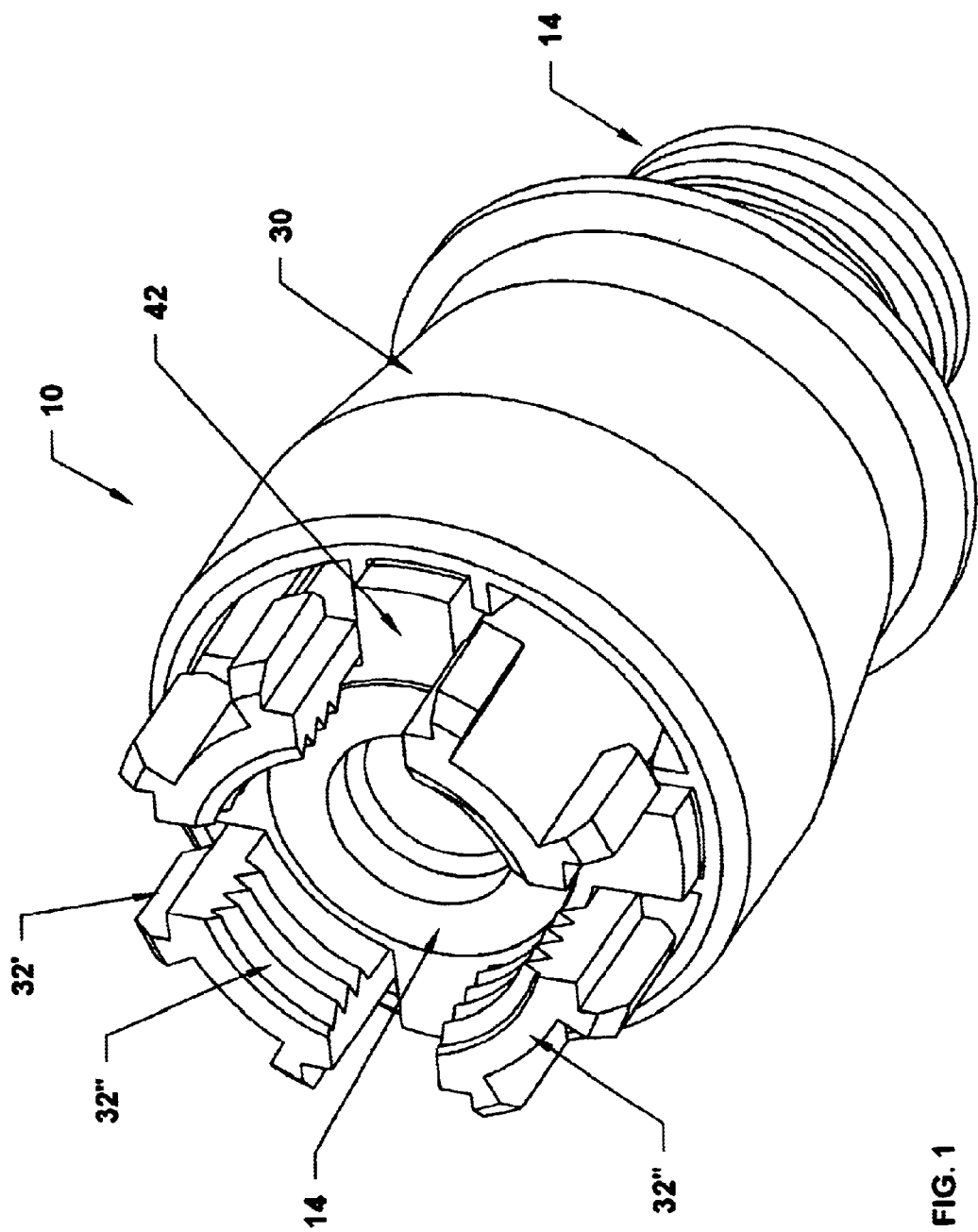
FIG. 1 is an isometric assembly view showing the first embodiment of the quick-connecting hose coupler of the present invention using mechanical locking operation.
Figure 2:
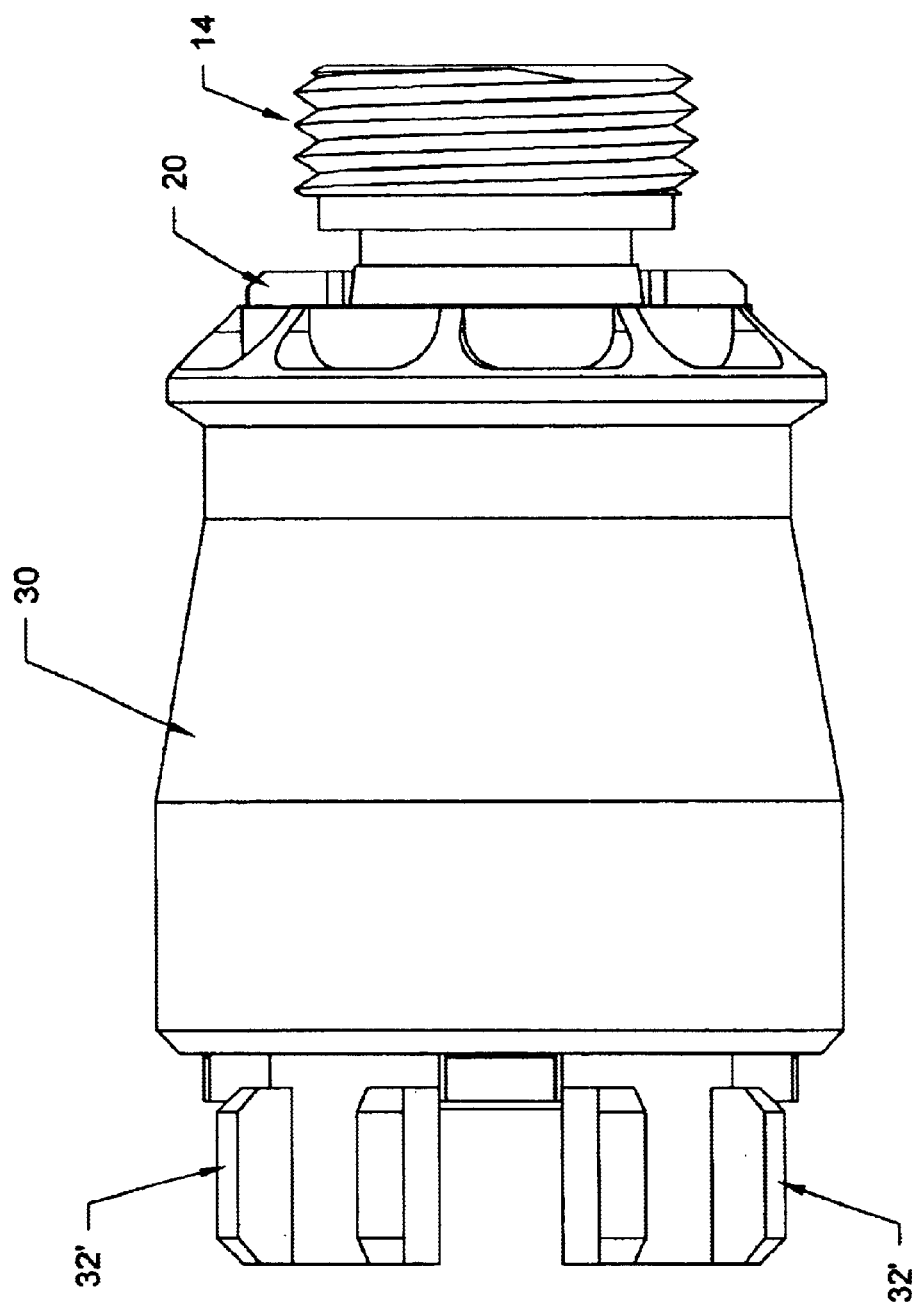
FIG. 2 is a side elevational view thereof.
Figure 12:
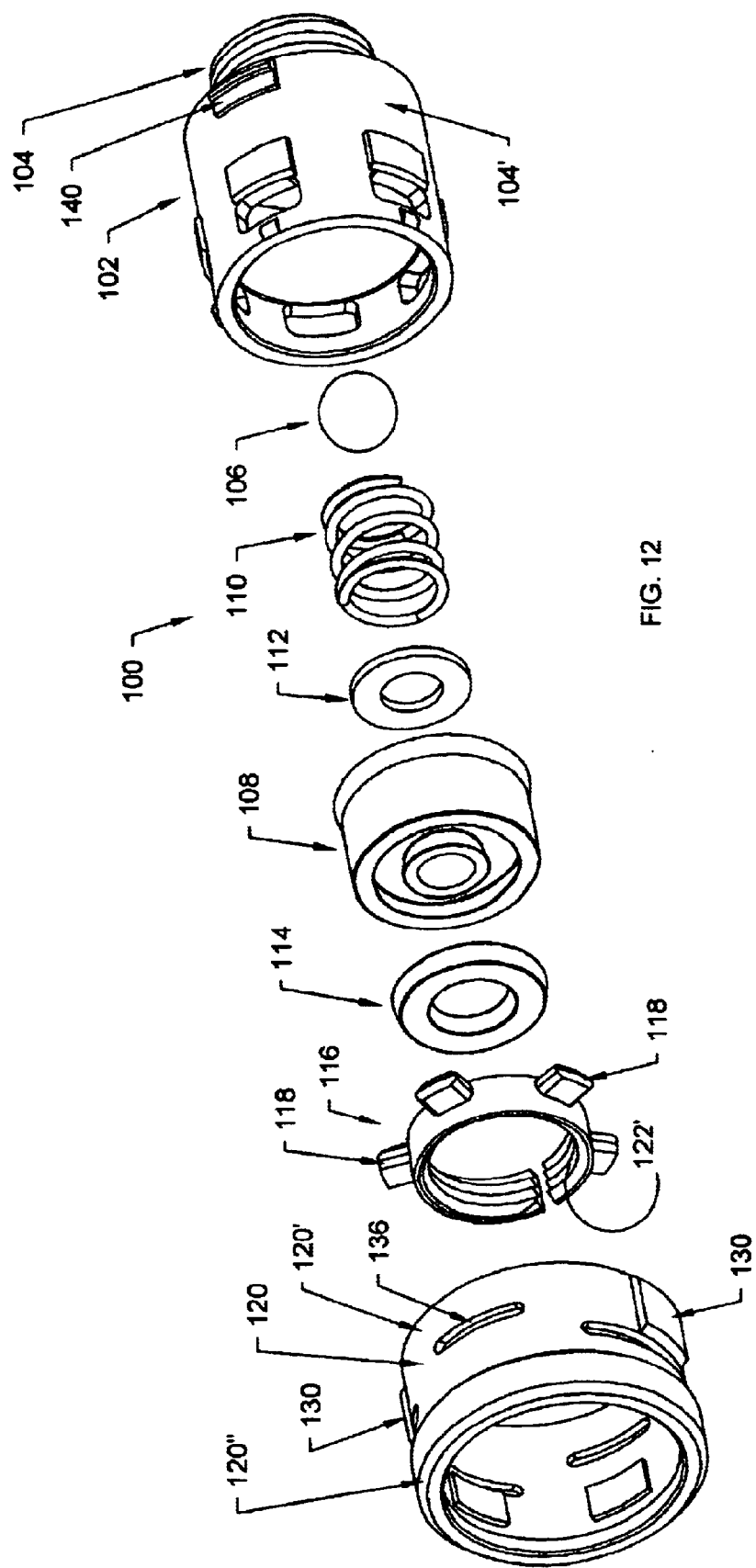
FIG. 12 is an isometric assembly view showing the second embodiment of the invention which is a hydraulic-powered hose-coupler.
Figure 13:
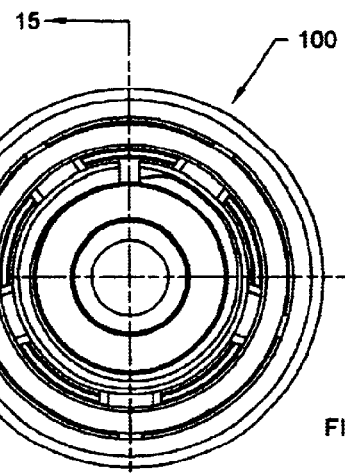
FIG. 13 is an end view thereof.
Figure 14:
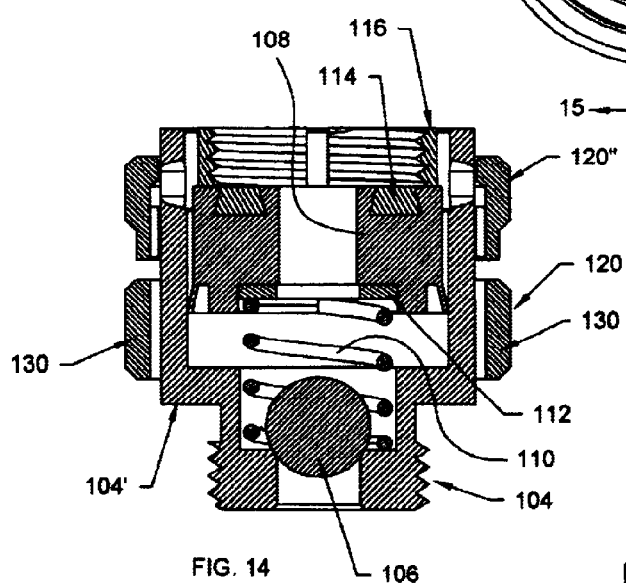
FIG. 14 is a cross-sectional view taken along line 14—14 of FIG. 13.

Referring now to FIGS. 20–23, there is shown a third embodiment of the coupler of the invention, which is similar to the mechanically-controlled and sealed coupler 10 of the first embodiment of FIG. 1 but incorporating the push-locking outer collet of the second embodiment of FIG. 12. The coupler 200 for hoses, pipe, faucets, and the like, is provided with a main frame or body portion 202 defining a threaded male-end 204 for receiving a female end of a hose, tube, or the like, and an enlarged annular central section 206. This enlarged annular central section 206 is provided with diametrically-opposite located threads or teeth 208, 210, similar to the grooves or threads 20' of the hose coupler 10 of the first embodiment. Partially telescoping the enlarged annular central section 206 is an outer retaining collet or sleeve 212 mounted for sliding movement between a locking state and a releasing state. The collet or sleeve 212 has an interior annular groove 214 in which is mounted a flexible and resilient locking ring 216. Diametrically-opposite sections of the locking ring 216 are provided with threaded or grooved sections 218 that cooperatively engage with respective diametrically-opposite located threads or teeth 208, 210 of the enlarged annular central section 206, which are used to lock the outer collet or sleeve 212 in either its locking or releasing state, as described hereinbelow. The locking ring 216 is also provided with diametrically-opposite push-members or buttons 222, spaced 90 degrees out of phase with the threaded or grooved sections 218. The push-buttons protrude through radially-extending cutouts 224, as seen in FIG. 21. The push-buttons 218 are pressed together or squeezed by one hand in order to distort the locking ring 216, to disengage the threaded sections 218 from the teeth 208, 210 to allow the collet 212 to slide, for reasons described hereinbelow. A split-ring 228 constitutes the female-end of the coupler 200. The split-ring 228 is similar to the split ring 116 of the second embodiment of FIG. 12, with the difference being that the split ring 228 is provided with a plurality of angularly and rearwardly extending fins 230 each defining a first, angular camming surface 230' and a second angular camming surface 230". The coupler 200 also has a like number of wedge-members 234 each defining an upper sloped or camming surface 234' and an angularly and rearwardly extending sloping or camming surface 234". The wedge-members are mounted for vertical movement in the main body portion 202 via cooperating vertical surfaces 241 of the wedge-members and vertical annular surface 241 of the main body portion. The camming surfaces 234' cooperate or mate with annular camming or sloping surface 236 of the outer collet. An annular spacer ring or member 240 for initially limiting the travel of the split ring 228 is provided between fins 230 and shoulder surface 246 of the enlarged annular central section 206. The spacer ring 240 defines a sloped or camming surface 240' for meshing with the sloped surfaces 230' of the split ring 228. Shoulder surface 246 is formed by the smaller-diameter section 248 of the main frame 202 which holds a washer or sealing member 250 that seals the male-end of a hose or faucet engaged in the split ring 228.

Figure 23:
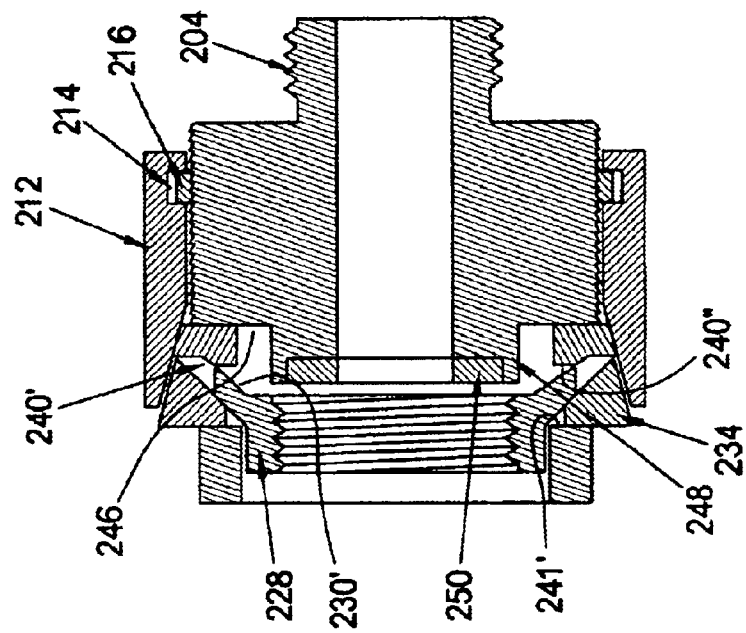
FIG. 23 is a longitudinal cross-sectional view thereof shown in a disengaged state.
Figure 22:
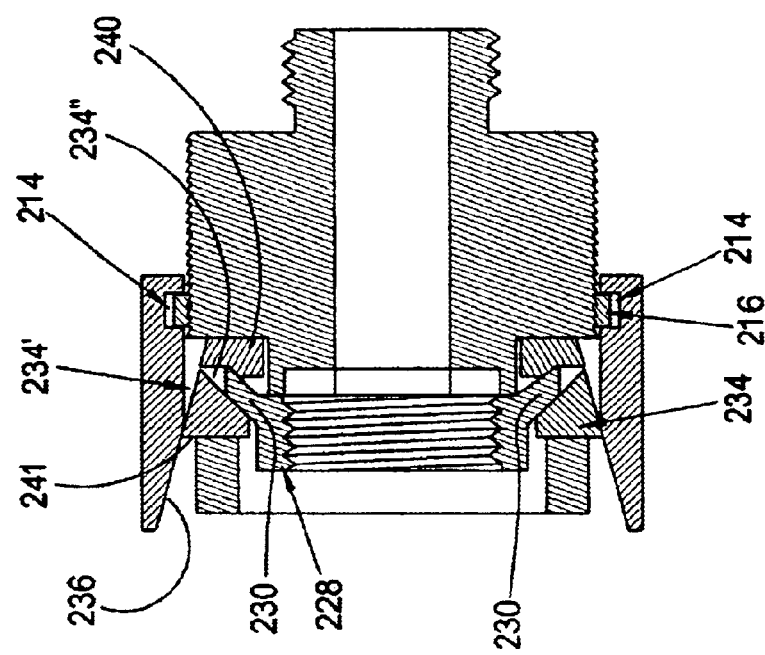
FIG. 22 is a longitudinal cross-sectional view thereof shown in an engaged state.

The coupler 200 is operated as follows. The coupler in its opened, disengaged state is as that shown in FIG. 23, with the outer collet 212 in its released position closer to the male-end 204 of the coupler. A male-end of a hose, pipe, faucet, or the like, is inserted into the interiorly-threaded split ring 228 and pushed against the washer 250. This initial movement or travel of the split ring against the washer is allowed by the spacer ring 240, since the mating sloping surfaces of the split ring and the spacer ring are spaced from each other as shown in FIG. 23. This initial travel of the split ring 240 provides an initial seal, and ends when the end of the mating sloping surfaces of the split ring contact the flat surface 240" of the spacer ring as best seen in FIG. 23. The final seal is achieved by releasing the outer collet for sliding movement by squeezing the push-buttons 222, and sliding the collet in the direction of the split ring, which causes the radial compression of the spacer ring 240, which causes the sloping or camming surface 240' thereof radially interiorly. This compression allows the split ring 230 greater travel interiorly, via camming surfaces 230' and 240' of the split ring and spacer ring. The interiorly travel of the split ring is forced via the wedge-members 234 by means of the their downward movement as the mating camming surfaces 234' and 236 engage. The downward movement of the wedge-members compresses the split ring to lock-the male-end therein, and push the split ring interiorly by means of the mating camming surfaces 230' and 234". After this final seal has taken place, the push-buttons 224 are released, and the collet retained in its retaining position for locking the split ring in place about the male-end inserted therein. To disengage the male-end and release it from the split ring, the procedure is reversed.

The coupler of the invention may be used on tapered pipes, such as line-pipe connections and pipe connections used in the oil and gas industry, etc. Moreover, instead of using wedges for providing mechanical advantage, there may be used instead ball-shape rollers, fulcums, lever, cam, rack and pinion/gear, leverage device and any mechanism that develops mechanical advantage.

The quick-connector of the invention may also be used for the assembling of pipe framing, such as tent poles and scaffolding, etc., where no sealing is required. In this case, no sealing washer or the like is provided nor used.

In addition to coupling to a threaded male-end, either the mechanical or hydraulic quick connector of the invention may be connected to a pipe provided with a groove or cut-out on its outer diameter to receive a non-threaded quick-connector of either of the mechanical and hydraulic versions of the invention. In this case, the female-end of the coupler is provided without threads to receive the non-threaded pipe-end which has a groove or lip thereof.

FIGS. 24A and 24B show these other modifications. FIG. 24A shows a modification where the mechanical quick-coupler 200 of the invention is provided with a plurality—such as four—ball bearings or spheres 202 instead of wedge-members for providing the mechanical advantage. The coupler 200 is also provided with a female-end consisting of a collet 204 similar to the collet 32 with furcated flexible arms of FIG. 8, except that the collet 204 does not have any threads on its flexible furcated arms. This would be used in the case of a pipe-end 206' of a pipe 206 having just a groove or cutout 206". The coupler 200 also differs in that instead of a threaded male-end thereof, a threaded female end 210 is used in order to screw onto a threaded tapered end 212' of a tapered pipe 212, such a water, sewer or gas pipe or line. Thus, the quick-connect coupler may be used for coupling two male-ends together.

FIG. 24B shows the other above-discussed modifications. In this modification, the coupler 220 has an unthreaded female-end 222 like that of FIG. 24A, but connects to an unthreaded pipe-end 224' of a pipe 224 having a lip or detent 224" for matingly locking with the female-end 222. The other end of the coupler may have a welded or otherwise affixed pipe attached thereto to form one, integral piece with the coupler 220.

Although not shown, the coupler of FIG. 24A or 24B may be a double-ended one, in which each end of the coupler is provided with a female collet 32 or 204 with furcated flexible arms or fingers for any of the versions hereinabove described. In this version, the coupler quick-connects two pipes similar to pipes 206 or 224.

While specific embodiments of the invention have been shown and described, it is to be understood that numerous changes and modifications may be made therein without departing from the scope and spirit of the invention as set forth in the appended claims.

What is claimed is:

1. A coupler having a female-end for connection to a male-end of an element, comprising:
    a main frame;
    a collet means mounted for translational slidable movement by said main frame, said collet means comprising flexible engaging means for engaging a cooperating portion of a male-portion of an element;
    an outer retaining member mounted for translational sliding by said main frame, said outer retaining member being at least partially telescopingly movable about said collet means for preventing said flexible engaging means from disengaging with the male-portion of an element, and comprising first engaging means;
    an inner retaining means mounted by said main frame for relative translational sliding motion with respect to said outer retaining member, and comprising second cooperating means, said inner retaining means capable of retaining said outer retaining member in a retained position via said first and second cooperating means;
    means for translating said flexible engaging means of said collet means;
    said means for translating comprising third cooperating means in operative association with said collet means and said outer retaining member for alternatively moving said collet means in a first direction and in a second direction.

2. The coupler according to claim 1, further comprising sealing means operatively associated with said main frame for providing a seal for a male-end of an element; said means for translating comprising wedge means having a first wedge-surface, a second wedge-surface and a third wedge-surface; said main frame comprising a first canted-surface means for contact with said first wedge surface of said wedge means for movement of said wedge means therealong; said outer retaining member comprising a second canted-surface means for contact with said second wedge-surface of said wedge-means; and said collet means comprising engaging surface means for contact with said third wedge-surface; said wedge means causing said collet means to move relative to said main frame by said contacting third wedge-surface and said engaging surface means when said retaining member is moved relative to said collet means by contact of said second canted-surface means with said second wedge-surface of said wedge-means.

3. The coupler according to claim 1, wherein each of said first cooperating means and said second cooperating means comprises a canted surface for compressing said inner retaining member, and further comprising cooperating locking means for retaining said outer retaining member in a position relative to said compressible inner retaining member for keeping said inner retaining member in a compressed state.

4. The hose coupler according to claim 3, wherein said means for translating comprises wedge means having a first wedge-surface, a second wedge-surface and a third wedge-surface; said main frame comprising a first canted-surface means for contact with said first wedge surface of said wedge means for movement of said wedge means therealong; said outer retaining member comprising a second canted-surface means for contact with said second wedge-surface of said wedge-means; and said collet means comprising engaging surface means for contact with said third wedge-surface; said wedge means causing said collet means to move in said main frame by said contacting third wedge-surface and said engaging surface means when said outer retaining member is moved relative to said collet means by contact of said second canted-surface means with said second wedge-surface of said wedge-means.

5. The hose coupler according to claim 1, wherein said inner retaining means comprises a flexible, compressible sleeve; said first cooperating means and said second cooperating means comprises compressing means for compressing said inner retaining member; said flexible, compressible sleeve comprising third cooperating means, and said collet means comprising fourth cooperating means, said third cooperating means and fourth cooperating means cooperating being in operative engagement so that when said said first cooperating means and said second cooperating means compress said flexible, compressible sleeve, said collet means is allowed greater translational movement by said means for translating.

6. In a coupler having a female-end for connection to a male-end of an element, comprising:
    a main body portion;
    collet means mounted for translational slidable movement relative to said main body portion, said collet means comprising flexible engaging means for engaging a portion of a male-portion of an element;
    an outer retaining member mounted for translational sliding relative to said main frame and also relative to said collet means, said outer retaining member being at least partially telescopingly movable about said collet for preventing said flexible engaging means from disengaging with the male-portion of an element, and comprising first engaging means;
    retaining means capable of holding said outer retaining member in a locking position; and
    intermediate means for slidably moving said flexible engaging means of said collet means toward and away from said main body portion;
    said means for moving comprising wedge means having a first wedge-surface, a second wedge-surface and a third wedge-surface; said main body portion comprising a first canted-surface means for contact with said first wedge surface of said wedge means for movement of said wedge means therealong; said outer retaining member comprising a second canted-surface means for contact with said second wedge-surface of said wedge-means; and said collet means comprising engaging surface means for contact with said third wedge-surface; said wedge means causing said collet means to move relative to said main body portion by said contacting third wedge-surface and said engaging surface means when said retaining member is moved relative to said collet means by contact of said second canted-surface means with said second wedge-surface of said wedge-means.

7. The coupler according to claim 6, wherein said outer retaining member comprises a first cooperating means; said retaining means being mounted by said main body portion for relative sliding motion in said outer retaining member, and comprising second cooperating means; said retaining means comprising a compressible member capable of holding said outer retaining member in a locking position via said first and second cooperating means;

each of said first cooperating means and said second cooperating means comprising means for compressing said retaining means, and further comprising cooperating locking means for locking said outer retaining member in a position relative to said compressible member for keeping said compressible member in a compressed state.

8. The hose coupler according to claim 6, wherein said retaining means comprises a compressible member having a first end-portion and a second end-portion; said collet means being capable of abutting contact with said second end portion of said compressible member; said outer retaining member having means for compressing said compressible member when said outer retaining member is moved in the direction of said collet means, whereby when said compressible member is compressed, said collet means is allowed movement by said means for moving in a direction toward said main body portion to thereby secure a male-end held in said flexible engaging means.

9. The coupler according to claim 8, wherein said compressible member comprises a tubular element having cutout means in order to form a plurality of furcated arms; said tubular element having an outer circumferential surface and first cooperating means formed on said outer circumferential surface; said outer retaining member comprising said second cooperating means for cooperating with said first cooperating means for compressing said plurality of arms; and further comprising additional cooperating means for releasably holding said outer retaining member in a position relative to said compressible member for keeping said compressible member in a compressed state.

10. A method of coupling a male-end of an element, comprising:

(a) inserting a male-end into a flexible, floating collet member having mating engaging means for the male-end;

(b) said step (a) comprising pushing the male-end thereagainst to cause the engaging means of the collet member to initially engage with the male-end inserted therein and for translationally moving the collet member a first lateral distance by contact of the collet means against a limit-stop;

(c) after said step (b), allowing the collet member additional translational lateral movement;

(d) said step (c) sealing the male-end against the sealing member;

(e) said step (c) comprising moving the limit stop a distance that allows said additional translational lateral movement.

11. The method according to claim 10, wherein said step (e) comprises compressing a compressible member having engaging means that engage with said collet member, said step of compressing moves the engaging means away from the collet member to thus allow said additional lateral movement.

12. The method according to claim 11, wherein said step of compressing comprises initially sliding an outer setting sleeve about the compressible member; said method further comprising retaining said collet in its engaged sealing state with the male-end, said step of retaining comprising additionally sliding said outer setting sleeve for lockingly engaging means on the outer setting sleeve with cooperating engaging means on the compressible member, whereby the threaded male-end is held locked in sealed relationship with the sealing member.

13. In a coupler having a female-end for connection to a male-end of an element, comprising:

a main body portion;

collet means mounted for translational slidable movement relative to said main body portion, said collet means comprising flexible engaging means for engaging a portion of a male-portion of an element;

an outer retaining member mounted for translational sliding relative to said main frame and also relative to said collet means, said outer retaining member being at least partially telescopingly movable about said collet for preventing said flexible engaging means from disengaging with the male-portion of an element, and comprising first engaging means;

retaining means capable of holding said outer retaining member in a locking position; and intermediate means for slidably moving said flexible engaging means of said collet means toward and away from said main body portion;

said outer retaining member comprising a first cooperating means; said retaining means being mounted by said main body portion for relative sliding motion in said outer retaining member, and comprising second cooperating means; said retaining means comprising a compressible member capable of holding said outer retaining member in a locking position via said first and second cooperating means;

each of said first cooperating means and said second cooperating means comprising means for compressing said retaining means, and further comprising cooperating locking means for locking said outer retaining member in a position relative to said compressible member for keeping said compressible member in a compressed state.

14. In a coupler having a female-end for connection to a male-end of an element, comprising:

a main body portion;

collet means mounted for translational slidable movement relative to said main body portion, said collet means comprising flexible engaging means for engaging a portion of a male-portion of an element;

an outer retaining member mounted for translational sliding relative to said main frame and also relative to said collet means, said outer retaining member being at least partially telescopingly movable about said collet for preventing said flexible engaging means from disengaging with the male-portion of an element, and comprising first engaging means;

retaining means capable of holding said outer retaining member in a locking position; and intermediate means for slidably moving said flexible engaging means of said collet means toward and away from said main body portion;

said retaining means comprising a compressible member having a first end-portion and a second end-portion;

said collet means being capable of abutting contact with said second end-portion of said compressible member; said outer retaining member having means for compressing said compressible member when said outer retaining member is moved in the direction of said collet means, whereby when said compressible member is compressed, said collet means is allowed movement by said means for moving in a direction toward said main body portion to thereby secure a male-end held in said flexible engaging means.

15. The coupler according to claim 14, wherein said means for moving comprises wedge means having a first wedge-surface, a second wedge-surface and a third wedge-surface; said main body portion comprising a first canted-surface means for contact with said first wedge surface of said wedge means for movement of said wedge means therealong; said outer retaining member comprising a second canted-surface means for contact with said second wedge-surface of said wedge-means; and said collet means comprising engaging surface means for contact with said third wedge-surface; said wedge means causing said collet means to move relative to said main body portion by said contacting third wedge-surface and said engaging surface means when said retaining member is moved relative to said collet means by contact of said second canted-surface means with said second wedge-surface of said wedge-means.

16. The coupler according to claim 14, wherein said compressible member comprises a tubular element having cutout means in order to form a plurality of furcated arms; said tubular element having an outer circumferential surface and first cooperating means formed on said outer circumferential surface; said outer retaining member comprising said second cooperating means for cooperating with said first cooperating means for compressing said plurality of arms; and further comprising additional cooperating means for releasably holding said outer retaining member in a position relative to said compressible member for keeping said compressible member in a compressed state.

* * * * *